United States Patent Office 3,744,994
Patented July 10, 1973

3,744,994
METHOD OF SEPARATING COPPER
FROM NICKEL
Klaus Emicke and Wilhelm Goralczyk, Hamburg, Germany, assignors to Norddeutsche Affinerie, Hamburg, Germany
No Drawing. Continuation-in-part of application Ser. No. 70,508, Sept. 8, 1970. This application Dec. 30, 1970, Ser. No. 102,941
Claims priority, application Germany, Sept. 19, 1969, P 19 47 535.5
Int. Cl. C22b 15/08, 23/04
U.S. Cl. 75—101 R                                   4 Claims

ABSTRACT OF THE DISCLOSURE

A process for recovering copper and nickel from compositions containing copper and nickel in the presence of sulfidic sulfur in which the composition, which must have sulfur in an amount of at least 20% by weight of the copper content or which contains at least 50% by weight nickel, is slurried with sulfuric acid having a $H_2SO_4$ concentration of 400–800 g./liter, is heated to a temperature of 110° to 120° C., and is permitted to stand at this temperature until the metal (nickel) which forms unstable sulfates in sulfuric acid are converted into sulfates. The solid and liquid phases are then separated and treated separately for recovery of the metal.

CROSS REFERENCE TO COPENDING APPLICATION

The present application is a continuation-in-part of our commonly assigned application Ser. No. 70,508, filed Sept. 8, 1970, now U.S. Pat. No. 3,684,489, and entitled Method of Recovering Metals From Sulfide-Containing Mixtures.

FIELD OF THE INVENTION

Our present invention relates to a process for separating metals and, more particularly, to a process for recovering metals from mixtures or compositions thereof containing sulfidic sulfur. The invention applies, more specifically, to the separation of copper and nickel from compositions consisting primarily of copper, nickel and sulfidic sulfur and especially copper-nickel matte as may be produced by pyrometallurgical and other processes.

The invention also relates to an improvement in the process described and claimed in the aforementioned copending application.

BACKGROUND OF THE INVENTION

Numerous processes have been proposed heretofore for the separation of metals and, on an industrial scale, it is known to separate one metal from another in a mixture or composition thereof by pyrometallurgical and hydrometallurgical techniques. For the purposes of the present disclosure, the terms "separation" and "recovery" are used interchangeably to indicate that two metals in a composition are separated from one another, whether or not either metal is finally obtained in a pure form. For example, either of the products of a separation may undergo further refining and may be used as a compound of a metal or group of metals, may be introduced into further metallurgical processes, etc., within the meaning of this application. Of course, either metal or any compound thereof can be recovered in a pure state. Most pyrometallurgical systems effect a breakdown of the compounds of the composition under heat in the presence of, or in the absence of, other reactants designed to tie up or release the metal of interest. Hydrometallurgical processes make use of chemical reactions in an aqueous medium to separate the metals.

Pyrometallurgical processes have the disadvantage that they require complicated apparatus, e.g. expensive dust-collection equipment, elevated temperatures and devices for the careful monitoring of the reaction, as contrasted with a hydrometallurgical system which does not have such requirements. Furthermore, pyrometallurgical techniques are less selective, for the most part, and do not always yield a quantitative or substantially quantitative separation.

Both metallurgical processes, i.e., hydrometallurgical andy pyrometallurgical, as provided heretofore, have had the additional disadvantage that they can be carried out only with metal concentrations within specific and relatively narrow ranges and may be relatively complex. For example, a copper matte may be subjected in a prior-art process to initial oxidation by roasting in the presence of oxygen before the mixture is subjected to treatment with sulfuric acid to form the metal sulfate. The roasting converts the copper sulfide to copper oxide and the nickel sulfides to nickel oxide; subsequent leaching processes a solid fraction containing mainly nickel oxide and a liquid fraction containing mainly copper. Almost invariably, the nickel fraction contains a high residual-copper concentration while the copper extract has a high nickel concentration. As a result, a considerable proportion of the copper must be recirculated for the system to be economically feasible and relatively pure metal to be obtained. In another process using hydrometallurgical principles, sulfuric acid and air are used to treat the nickel-copper matte and thereby form a copper-free nickel extract as the nickel phase. The solid residue, however, contains considerable quantities of nickel together with copper which constitutes the primary metal. In this case, large amounts of nickel must be recirculated. Electrolytic purification of the copper, in spite of the recirculation and repetition of leaching and treatment steps, generally yields a product with a minimum of 100 parts per million (p.p.m.) of nickel.

OBJECTS OF THE INVENTION

It is, therefore, the principal object of our present invention to provide an improved process for separating one metal from another in a mixture of composition containing sulfidic sulfur whereby the aforementioned disadvantages are avoided.

Another object of our invention is to provide an improved method of the character described which permits a relatively pure metallic component to be obtained from such a mixture or composition, the method requiring no significant recirculation of phases containing the metal of interest.

Still another object of the invention is the provision of an improved intermediate procedure in the production of high-purity metals to separate or recover at least one metal with relatively high purity from a sulfidic composition containing a number of metals not readily separable in an economical manner by earlier hydrometallurgical techniques.

It is also an object of the invention to provide an improved process for separating copper and nickel from one another and/or recovering copper and/or nickel relatively free from contamination of one by the other from a copper-nickel matte.

Another important object of this invention is to extend the principles originally set forth in the above-identified application.

SUMMARY OF THE INVENTION

We have discovered, as pointed out originally in the above-identified application that it is possible to treat a copper-nickel sulfide composition in such manner as to eliminate recirculation by careful selection of the sulfuric acid concentration and temperatures to obtain two phases in which the copper and nickel separate with a high degree of resolution for further processing. More specifically, a copper-nickel matte as obtained from a pyrometallurgical process is treated with sulfuric acid of a $H_2SO_4$ concentration of at least 400 g./liter, but less than 1000 g./liter to form a slurry. In practice, the solid composition is slurried with the sulfuric acid having a concentration at least equal to 400 g./liter $H_2SO_4$ in an amount sufficient to chemically react the metal whose sulfide is unstable in the sulfuric acid, the slurry corresponding to a digestion of the solid composition by the sulfuric acid liquor. The slurry, as described in that application, was evaporated to a concentration of about 1000 g./liter $H_2SO_4$ (although slightly higher concentrations were also possible) and the initial concentration of the sulfuric acid was less than about 800 g./liter. The evaporation yielded a digested slurry with a sulfuric-acid concentration of at least 900 g./liter $H_2SO_4$ but less than about 1200 g./liter $H_2SO_4$. After the slurry was evaporated to the indicated concentration, the slurry was heated to a temperature of about 130° C., but not more than 140° C., for a period of about 1 hour (i.e. 30 minutes to 10+ hours), it being noted that the effect of the heating stage falls off sharply after about 1 hour. The heating stage could use temperatures below 130° C. although it was found that the effectiveness of the process decreased rapidly below this temperature and that the practical minimum for the reheating step was 12° C.

The duration of heating was determined by the composition treated in the sense that heating was maintained until the metal or metals having sulfides which are unstable in the presence of sulfuric acid, is or are fully converted to the corresponding metal sulfates. The solid phase was then separated from the liquid phase and was found to consist of metal sulfates which can be leached with water to produce, on the one hand, an extract containing the metal sulfates and, on the other hand, a solid component containing metal sulfides substantially free from those metals which have unstable sulfides in the presence of sulfuric acid. These components were individually subjected to conventional treatment for recovery of the individual metal or of metal compounds.

The initial separation of the sulfuric acid from the digested solid was carried out by filtration, centrifugation, decantation, or the like. The starting material was preferably slurried in a sulfuric acid medium having a concentration of about 600 g./liter $H_2SO_4$, this solution having been found to be particularly effective with copper-nickel matte and for the treatment of these mixed copper and nickel sulfides. The comminuted or disintegrated matte is slurried with 600 g./liter $H_2SO_4$ to permit complete digestion of all of the soluble components and the copper-nickel matte, i.e. the copper-nickel sulfides, are completely solubilized in this stage of the process. Any other components of the composition remain as a solid which can be separated from the liquid phase. The slurry is then reformed by concentration of the liquid (liquid phase), by heating to a temperature corresponding approximately to the boiling point of the liquor until the concentration reaches about 1000 g./liter $H_2SO_4$. Thereafter, the slurry is heated to about 130° C. and stirred for about 1 hour at this temperature. The liquid phase is separated from the solid phase and the solid phase is leached with water to form a liquid component and a solid residue. The liquid component is found to contain nickel sulfate and to be substantially free from copper salts whereas the solid residue contains copper and any noble or low-reactivity metals and is substantially free from nickel. Both the liquid component and the solid residue may be subjected to further processing to recover metallic nickel or metallic copper.

In the system of the aforedescribed application, a relatively high concentration of sulfuric acid, e.g. a minimum of 400 g./liter $H_2SO_4$ must be used and the slurry concentrated to a sulfuric-acid concentration of 1000 g. of $H_2SO_4$ per liter of the solution. Surprisingly, we have now found after further research, that certain starting materials may be used which require significantly less strenuous reaction conditions and provide for greater economy. When, for example, the comminuted starting material, generally copper-nickel sulfides, contain at least about 20% by weight sulfur in terms of the copper content or 50% by weight nickel based upon the entire composition, the slurry may use sulfuric acid with a concentration of 400 to 800 g./liter $H_2SO_4$, preferably 600 g./liter $H_2SO_4$, which may be heated to 110° to 120° C. and permitted to stand at this temperature until the metals which form sulfides unstable in sulfuric acid have been converted into sulfates. In other words, when the sulfur content of the composition constitutes 20% or more by weight of the copper content and/or the nickel content is 50% by weight of the composition, it is possible to avoid the sequential steps of concentrating the sulfuric acid solution and reheating the same. As in the system described in our previous application, the solid and liquid phases are separated and subjected to known separating methods.

The new process thus enables the use of a much lower temperature and eliminates the need for evaporation of the slurry to a concentration of about 1000 g./liter of $H_2SO_4$ when a particular starting composition is employed and/or the composition of the starting material is adjusted to fit into the range of those which separate is accordance with the improved technique. The process of the present invention has the same advantages over the prior art as the system described in our earlier application, i.e. the process eliminates the need for complicated pretreatment of the starting material; moreover, the first stage itself provides a virtually complete separation of those metals (nickel) which form unstable sulfides in sulfuric acid and those metals which form stable (copper) sulfides in sulfuric acid.

SPECIFIC EXAMPLES

Example I 1000 kg. of ground copper/nickel matte (49.35% by weight copper, 39.2% by weight nickel, 0.3% by weight iron, and 10.1% by weight sulfur) is introduced into 5000 liters of sulfuric acid (concentration=600 g./liter $H_2SO_4$) and heated to 110° C. with stirring. Heating is continued for a period of 2 hours at this temperature when it is found that more than 92% by weight of the nickel of the starting material has been dissolved; the heating takes place in ambient pressure and introduction of air.

A solid phase is separated from the liquid phase, the latter being found to be a solution of nickel substantially free from copper. Conventional nickel-winning processes using, for example, galvanic methods may be used to recover the nickel. The solid phase contains substantially all of the copper and can be processed by any conventional copper-recovery procedure. The entire copper content of the starting material is contained in the residue which amounts to 655 kg. and consists of 75.3% by weight copper, 5.75% by weight nickel, 0.2% by weight iron and 18.5% by weight sulfur.

Example II 1000 kg. of ground nickel-copper matte (30.32% by weight copper, 64.05% by weight nickel, 0.35% by weight iron, and 4.5% by weight sulfur) is charged into 5000 liter of sulfuric acid (concentration=700 g./liter $H_2SO_4$) and the mixture heated with exclusion of air to 110° C. with stirring. In this case, the reaction was virtually complete after about 2 hours as well. Filtration gave a copper-free nickel extract containing more than 91% by weight of the nickel of the starting material and 420 kg. of a solid residue which contained all of the copper. The analysis of the residue was: 71.65% by weight copper, 14.25% by weight nickel, 9.5% by weight sulfur.

We claim:

1. A method of separating copper from nickel in a copper-nickel matte containing sulfidic sulfur, consisting essentially of the steps of:

treating without prior rapid cooling a sulfidic copper-nickel matte, wherein the sulfur constitutes at least about 20% by weight of the copper content and/or the nickel constitutes at least 50% by weight of the raw material, with sulfuric acid of a concentration of 400 to 800 g./liter $H_2SO_4$ to form a mixture;

heating the resulting mixture to a temperature of about 110° and to 120° C. for a period of about two hours and sufficient to dissolve the major portion of the nickel of said copper-nickel matte; and thereafter separating a solid phase containing substantially all of the copper of said copper-nickel matte from a nickel-rich liquid phase.

2. The method defined in claim 1 wherein said material is treated with sulfuric acid of a concentration of about 600 to 700 g./liter $H_2SO_4$.

3. The method defined in claim 1, further comprising the step of recovering nickel from said liquid phase.

4. The method defined in claim 1, further comprising the step of recovering copper from said solid phase.

References Cited

UNITED STATES PATENTS 1,756,092   4/1930   Lathe _____ 75—119
2,223,239   11/1940  Hamprecht et al. _____ 75—119

GEORGE T. OZAKI, Primary Examiner

U.S. Cl. X.R.

75—115, 117, 119